(12) United States Patent
Samuelsson et al.

(10) Patent No.: US 8,897,585 B2
(45) Date of Patent: Nov. 25, 2014

(54) PREDICTION OF PIXELS IN IMAGE CODING

(75) Inventors: Jonatan Samuelsson, Stockholm (SE);
Kenneth Andersson, Gävle (SE);
Rickard Sjöberg, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 210 days.

(21) Appl. No.: 13/505,735

(22) PCT Filed: Nov. 5, 2010

(86) PCT No.: PCT/SE2010/051212
§ 371 (c)(1),
(2), (4) Date: May 2, 2012

(87) PCT Pub. No.: WO2011/056140
PCT Pub. Date: May 12, 2011

(65) Prior Publication Data
US 2012/0213449 A1 Aug. 23, 2012

Related U.S. Application Data

(60) Provisional application No. 61/258,386, filed on Nov. 5, 2009.

(51) Int. Cl.
*H04N 19/553* (2014.01)
*H04N 19/80* (2014.01)
(Continued)

(52) U.S. Cl.
CPC ..... *H04N 19/00648* (2013.01); *H04N 19/0089* (2013.01); *H04N 19/00024* (2013.01); *H04N 19/00278* (2013.01); *H04N 19/00781* (2013.01); *H04N 19/00684* (2013.01); *H04N 19/00042* (2013.01); *H04N 19/00763* (2013.01)
USPC ............. 382/238; 375/240.05; 375/240.12; 375/240.14; 375/240.15; 382/248

(58) Field of Classification Search
CPC .................................................. H04N 7/345
See application file for complete search history.

(56) References Cited

U.S. PATENT DOCUMENTS 5,701,160 A * 12/1997 Kimura et al. ........... 375/240.14
5,886,742 A * 3/1999 Hibi et al. ................ 375/240.16
(Continued)

FOREIGN PATENT DOCUMENTS

EP 2081388 A1 7/2009
WO 2007093629 A1 8/2007
(Continued)

OTHER PUBLICATIONS

Park, Chun-Su et al., "Estimation-based intra prediction alogorithm for H.264/AVC." Optical Engineering vol. 48, No. 3, Mar. 23, 2009. pp. 030506-1-030506-3. SPIE, Bellingham, WA.
(Continued)

*Primary Examiner* — Tsung-Yin Tsai
(74) *Attorney, Agent, or Firm* — Coats & Bennett, P.L.L.C.

(57) ABSTRACT

A method and arrangement for prediction of pixel values in an image decoder. In an image decoder, a reference vector which is provided by an image encoder is provided 500. An initiation region of pixels is determined 502, which corresponds to a reference region of pixels at the image encoder. The initiation region is spatially displaced in relation to the prediction region according to the reference vector, and a part of the initiation region overlaps a part of the prediction region. Pixel values are assigned 504 to pixels of the prediction region, whose corresponding pixel values in the initiation region are known. Pixel values of the overlapping region of the initiation region are assigned 506 to the corresponding pixels in the prediction region, the pixel values being assigned 504. By determining an overlapping initiation region based on a dynamic reference vector, characteristic variations close to the prediction region are possible to utilise when predicting images, which increases the accuracy of the prediction.

14 Claims, 8 Drawing Sheets

(51) Int. Cl.
*H04N 19/105* (2014.01)
*H04N 19/176* (2014.01)
*H04N 19/61* (2014.01)
*H04N 19/51* (2014.01)
*H04N 19/11* (2014.01)
*H04N 19/593* (2014.01)

(56) References Cited

U.S. PATENT DOCUMENTS

| | | |
|---|---|---|
| 7,120,196 B2 | 10/2006 | Yu et al. |
| 7,936,818 B2* | 5/2011 | Jayant et al. ............. 375/240.05 |
| 8,437,564 B2* | 5/2013 | Harmanci et al. ............. 382/248 |
| 8,548,056 B2* | 10/2013 | Sagetong et al. ......... 375/240.15 |
| 2006/0140277 A1* | 6/2006 | Ju ............................ 375/240.25 |
| 2008/0165850 A1* | 7/2008 | Sagetong et al. ......... 375/240.15 |
| 2009/0060362 A1* | 3/2009 | Harmanci et al. ............. 382/238 |
| 2010/0215101 A1* | 8/2010 | Jeon et al. ................. 375/240.12 |
| 2013/0128974 A1* | 5/2013 | Chien et al. .............. 375/240.15 |

FOREIGN PATENT DOCUMENTS

| | | |
|---|---|---|
| WO | 2008130367 A1 | 10/2008 |
| WO | 2010082231 A1 | 7/2010 |

OTHER PUBLICATIONS

Balle,J et al., "Extended Texture Prediction for H.264/AVC Intra Coding." Image Processing, 2007. ICIP 2007, IEEE International Conference on. vol. 6, Sep. 16, 2007-Oct. 19, 2007. pp. 93-96. IEEE, Piscataway, NJ.

ITU-T Recommendation H.264. "Advanced video coding for generic audiovisual services." May 2003. Geneva, Switzerland.

"Extended Texture Prediction for H.264 Intra Coding." VCEG-AE11. Jan. 2007. ITU—Telecommunication Standardization Sector. Geneva, Switzerland.

Yu et al., "New Intra Prediction using Intra-Macroblock Motion Compensation." JVT Meeting, May 2002, Fairfax, VA. Document JVT-C151. ISO/IEC MPEG & ITU-T VCEG.

* cited by examiner

PREDICTION OF PIXELS IN IMAGE CODING

TECHNICAL FIELD

The present invention relates generally to image-, and video coding. Especially, it relates to prediction of pixel values in images.

BACKGROUND ART

In modern video codecs, such as H.264 (ITU-TRec. H.264/ISO/IEC MPEG 14496-10, 2003), intra prediction is performed by extrapolation of decoded pixel values (on the border of the block) according to fixed directions. In the patent publication U.S. Pat. No. 7,120,196, it is proposed that a reference vector (or motion vector) can be used for infra prediction. The application of a reference vector for infra prediction can be described by following equation.

$$P(i,j)=R(y+i+m_y, x+j+m_x) \qquad \text{Equation 1}$$

Where P is the predicted block, R is previously reconstructed pixels, (y,x) is the picture coordinates of the top left corner of the predicted block where (0,0) is top left corner of the picture, (i,j) is the coordinates within the predicted block where (0,0) is in the top left corner and (I-1,J-1) is the bottom right corner, (my,mx) is the reference vector. The portion of R pointed out by the reference vector is denoted reference block.

For the pixels that are not yet decoded (for example the ones in the current block) it is said that these can be assigned a pixel value of 0 or 128. In the prior art document "S. -L Yu and C. Chrysafis, New Infra Prediction using Intra-Macroblock Motion Compensation, JVT meeting Fairfax, do c JVT-C151, May 2002.", two other techniques for assigning values to not yet encoded pixels are mentioned, pixel replication and symmetric extension.

Sub-pixel displacement is also possible by using a filter. process in combination with Equation 1, see below.

$$P(i, j) = \sum_{k=0}^{K-1} \sum_{l=0}^{L-1} F(i+k-K/2, j+l-L/2) R(y+i+m_y, x+j+m_x) \qquad \text{Equation 2}$$

Where F(k,l) is a filter coefficient of a 2D non-separable interpolation filter to obtain pixel values in-between pixel values in R. The filtering can also be achieved by separable filtering in horizontal and vertical direction as in H.264.

For the case of infra prediction according to H.264 below describe the horizontal prediction mode:

$$P(i,j)=R(y+i,x-1) \qquad \text{Equation 3}$$

Also for some of the directional extrapolation modes according to H.264 a filtering process is applied on the previously decoded pixel values before application of Equation 3.

It can also be noted that Equation 1 and Equation 2 also are valid for inter prediction in video coding, e.g. prediction from a decoded frame from another time instant than the current frame.

In an encoder the prediction mode (intra or inter) is entropy coded. The prediction block (inter or intra) is removed from the pixel values of an original block to obtain the prediction error block. The prediction error block is then transformed by for example DCT(Discrete Co sinus Transform) and the transform coefficients are quantized and entropy coded.

In the decoder the prediction mode is decoded. A prediction block is generated by for example applying Equation 3. The prediction error block is obtained after entropy decoding, inverse quantization and inverse transformation. The prediction error block is then added to the prediction block to obtain a reconstructed block.

In view of the prior art, there is a need for a more reliable and accurate method for prediction of pixel values in images.

SUMMARY OF INVENTION

It is an object to address at least some of the problems outlined above. In particular, it is an object to achieve a relatively accurate and flexible prediction of pixel values in an image. These objects and others may be achieved primarily by a solution according to the attached independent claims. The present invention applies to the case when intra prediction is performed by displacement of decoded pixel values in the current frame according to a reference vector. One problem remaining with the prior art techniques may be that the assignment of the not yet decoded pixels values uses a scheme that is fixed and static during the decoding process. The methods and arrangement according to the invention may achieve a dynamic and flexible way to predict pixel values.

According to one aspect, a method in an image encoder for enabling an image decoder to assign pixel values to a prediction region of pixels is provided. In the method, a reference region of pixels which fulfils a similarity condition for a current region of pixels of an image is determined. A part of the reference region overlaps a part of the current region. Furthermore, a reference vector which defines a spatial displacement between the current region and the reference region is determined. The reference vector is provided to the image decoder to be employed when assigning pixel values to the pixels in the prediction region.

According to another aspect, a method in an image decoder for assigning pixel values to pixels in a prediction region of an image is provided. In the method, a reference vector is provided by the image encoder. An initiation region of pixels corresponding to the reference region of pixels at the image encoder is determined, where the initiation region is spatially displaced in relation to the prediction region according to the reference vector, and a part of the initiation region overlaps a part of the prediction region.

According to a further aspect, an arrangement in an image encoder is provided, the arrangement being adapted to enable an image decoder to predict pixel values of an image. The arrangement in the image encoder comprises a processor which is adapted to determine a reference region of an image, wherein the reference region fulfils a similarity condition with the current region and a part of the reference region overlaps a part of the current region. The processor is further adapted to determine a reference vector defining a spatial offset between the current region and the reference region. The arrangement comprises also a memory which is arranged to store pixel values of one or more images, and a transmitter which is adapted to transmit the reference vector and pixel values of the image.

According to yet another aspect, an arrangement in an image decoder is provided, which is adapted to assign pixel values to pixels in a prediction region of an image. The arrangement comprises a receiver which is adapted to obtain a reference vector provided by the image encoder, and receive pixel values from the image encoder. The arrangement comprises further a first memory which is adapted to store the reference vector, and a second memory which is arranged to store pixel values of one or more images. Furthermore, a processor is comprised in the arrangement, which is adapted to determine an initiation region based on the prediction region and the reference vector, where an overlapping region of the initiation region overlaps a part of the prediction region. The processor is further adapted to assign received pixel values for pixels in the initiation region to the corresponding pixels in the prediction region, and to assign pixel values of pixels in the overlapping region of the initiation region to the corresponding pixels in the prediction region.

The prediction accuracy may increase by assigning values to pixels that are not yet decoded using a dynamic intra reference vector update.

BRIEF DESCRIPTION OF DRAWINGS

The invention is now described, by way of example, with reference to the accompanying drawings, in which.

DESCRIPTION OF EMBODIMENTS

In the following description, the expression "halfpel" (i.e. halfpixel) is applied to denote that a pixel value is determined from two or more adjacent pixels, i.e. the pixel value is a non-integer value. In an image decoding arrangement adapted to decode an image, pixel values of a prediction region of the image is to be predicted based on pixel values of an initiation region of the image, i.e. the pixel values of the prediction region are not known to the image decoder. A current region and the reference region at the image encoder correspond to the respective of the prediction region and the initiation region at the image decoder. To enable the image decoder to predict the pixel values of the prediction region, the image encoder determines a reference vector representing a spatial displacement between the current region and the reference region at the image encoder, and transmit the reference vector and pixel values of an image to the image decoder. The image decoder determines the initiation region which corresponds to the reference region and predicts pixel values based on the pixel values of the initiation region.

Below, it will be described by an example how the reference vector can be used to assign values to the not yet decoded pixels. In this example, pixels that are not yet decoded, are assigned values using the reference vector. This example is for intra prediction, but could also be used for inter prediction, e.g. prediction from decoded pixels of another image frame.

Figure 1A:
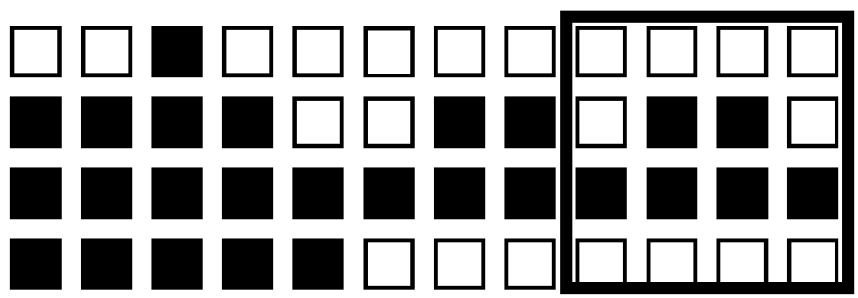
FIGS. 1a-d are illustrations of image prediction processes.

Consider the block that is to be decoded in FIG. 1a (To the bottom right, encompassed by a bold line) e.g. original pixel values. The other area shown is already decoded pixel values.

Figure 1B:
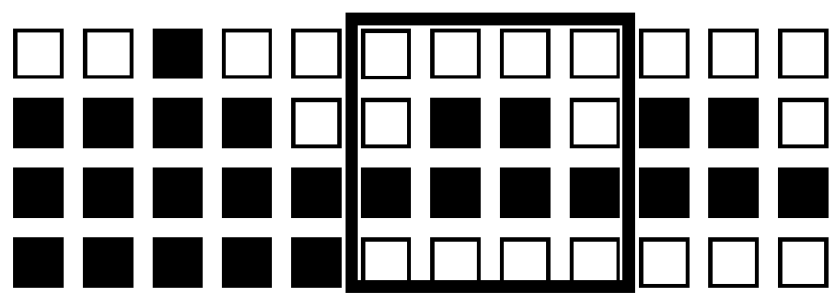

When searching for the reference vector, the best match for the block to be encoded would be a reference vector pointing three pixels to the left, as shown in FIG. 1b (encompassed by a bold line).

Here the dynamic intra reference vector update is used, which gives an exact match for the current block. In this case pixels that are not yet decoded are assigned values according to the reference vector, e.g. also copying from three pixels to the right but in this case pixels are copied twice. Thus the right most column of the block to be decoded will be predicted by the pixels in the first column of the reference block.

The process can be described as an iterative process. In a first step those pixels in the predicted block that can be predicted from previously decoded pixels according to the reference vector are predicted, see Equation 1.

In a second step those pixels in the predicted block that the reference vector is referencing, e.g. pixels that where predicted in the first step can now be used for prediction. After each step, more pixels will have been given values inside the block and this process will continue until each pixel has been given a predicted value. If this process is coupled in two steps, the first step needs only to be completed for those pixels that are used in the second step.

$$P(i,j)=P(i+m_y,j+m_x)$$ Equation 4

Figure 1C:
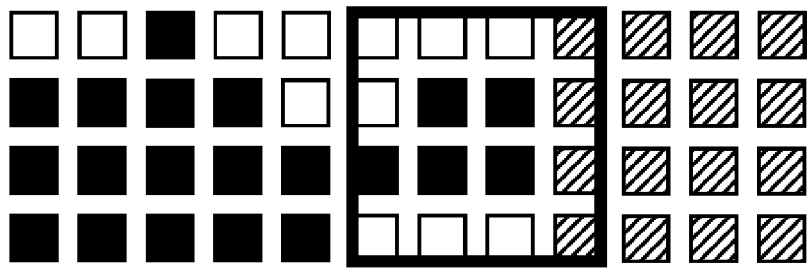
Figure 1D:
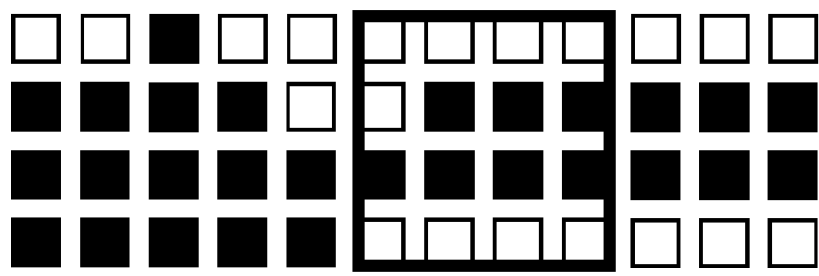

Two examples used in prior art are shown in FIG. 1c, mean value extension and FIG. 1d horizontal extension (also shown in Equation 3). It can be noted that the horizontal extension produce the same results as having a reference vector pointing one pixel to the left with the proposed invention, see Equation 1 and Equation 4.

In FIG. 1c, the not yet decoded pixels (filled with diagonal lines) are assigned the mean value of the pixels to the left (encompassed by bold line).

In FIG. 1d, the not yet decoded pixels are assigned the same value as the neighboring pixels to the left (horizontal extension).

Extrapolation according to a reference vector can be described with help of equations 1 and 4. The use of the dynamic reference vector update is preferably signaled on macro block level, e.g. 16×16 or larger blocks. One example is to use it for infra prediction of 8×8 blocks. In this case one reference vector needs to be coded and transmitted to the decoder for each 8×8 block The prediction error can be transformed and quantized and entropy coded and transmitted to the decoder as in the state of the art. The decoder decodes the macro block and if reference vector mode is obtained it decodes a reference vector for each 8×8 block and decodes the entropy coded prediction error makes inverse quantization and inverse transformation. For each 8×8 block, a predicted block is obtained as described in the equations above. The decoded prediction error is added to the prediction to reconstruct the 8×8 block.

In another embodiment of the invention, the not yet decoded pixels are assigned values using a directional scheme with the direction calculated from the reference vector. Here follows an example of how that can be performed.

First, the block to be encoded is predicted by copying pixel values from the reference block to the predicted block according to Equation 1. The example refers to what is done with the remaining pixels that are not assigned a value by the reference block. One approach to calculate the direction from the reference vector (my,mx) is to quantize a normalized reference vector into one out of a fixed number of directions. Normalization refers to dividing the reference vector with the length of the reference vector ($sqrt(mx^2+my^2)$). Then, this normalized vector is quantized to one out of a fixed number of values of the x component and the y component Example of directions can be e.g. vertical (−1,0) and horizontal (0,−1), diagonal 45 degree clockwise from horizontal direction (−1,−1), and diagonal 45 degrees counter clockwise from horizontal direction (−1,1). The length of the reference vector may indicate how far away pixels shall be copied from. Two different strategies can be used:

A first strategy is to extrapolate the remaining pixels directly according to the quantized direction, e.g. by setting (my,mx) to the quantized direction and perform Equation 4. This corresponds to pixel replication in the quantized direction.

Another strategy is to extrapolate in the quantized direction but with an offset corresponding to the length of the reference vector in the quantized direction. This can be achieved by projecting the reference vector in the quantized direction and thus achieve (qmy,qmx). Then this vector may be used instead of (my,mx) in Equation 4 to predict the remaining pixels.

In another exemplary embodiment, not yet decoded pixels are assigned values using a directional scheme where the direction is signalled to the decoder. In this case the first part of the predicted block is predicted according to a reference vector using Equation 1. In the next step the remaining pixels of the current block are predicted according to Equation 4 using the signalled direction vector. The direction vector can either refer to closest neighbour, e.g. pixel replication, or could be offset to pixels further away, e.g., pixel replication in a direction but with an offset.

In another exemplary embodiment, the not yet decoded pixels are assigned values using a second reference vector with a value that is different from the value of the first reference vector. This means that the first part of the predicted block is predicted according to a first reference vector using Equation 1. Then in a following step another reference vector is used according to Equation 4.

In another exemplary embodiment, a filtering process is applied on predicted pixels such as obtained from for example Equation 1 or Equation 2.

This filtering process can for example be a 2D filter but it can also be a 1D filter in a certain direction. The filtering can be separable or non-separable. Below, the general case of a non-separable 2D filter is described.

$$P(i, j) = \sum_{k=0}^{K-1} \sum_{l=0}^{L-1} F(i+k-K/2, j+l-L/2) P(i+m_y, j+m_x) \quad \text{Equation 5}$$

where F(k,l) is a filter coefficient of, for example, an interpolation filter to obtain pixel values in-between pixel values in P. F(k,l) can also be a filter coefficient of a low pass filter to remove structure in the prediction. An example of an interpolation filter is a bi-linear filter, such as $$\begin{bmatrix} 0.25 & 0.25 \\ 0.25 & 0.25 \end{bmatrix}.$$

This filter can be used when the reference vector has halfpels both horizontally and vertically, i.e. non-integer values, for example when the vector is (−0.5,−0.5). If the reference vector only is halfpel in one direction, for example in the horizontal direction (0,−0.5) it is only needed to apply a 1D bi-linear interpolation filter [0.5 0.5] in that direction to obtain the prediction.

When applying Equation 2 or Equation 5, and the filter includes non-decoded pixel values, e.g. lack a pixel value, a fixed value can be used in the filtering. An example of such a fixed value is the average value of the closest neighbouring previously decoded pixels of the current block, e.g. similar to the DC prediction in H.264 intra prediction.

Application of a Low-complexity Filtering Approach

Filtering of pixel values as part of the generation of the predicted block cause some additional complexity compared to copying pixel values. To reduce the filtering cost an approximative filtering process can be used instead of Equation 2 and Equation 5. In this case the filtering can be described as:

$$P(i,j) = W(i,j,m_y,m_x) R(y+i+m_y, x+j+m_x) + (1-W(i,j,m_y,m_x))S \quad \text{Equation 6}$$

$$P(i,j) = W(i,j,m_y,m_x) P(i+m_y, j+m_x) + (1-W(i,j,m_y,m_x))S \quad \text{Equation 7}$$

where W(i,j,my,mx) is a weight between 0 and 1, S is a fixed value. An example of S is the average value of previously decoded pixel values just outside the block to be predicted, e.g. a DC value (Discrete Co sinus). The DC value for a pixel is the mean value of adjacently located pixels. e.g the surrounding pixels. Thus the prediction will be equal to the DC value when W(i,j,my,mx)=0 and equal to Equation 4 when W(i,j,my,mx)=1, and otherwise the prediction will be in-between those two. W(i,j,my,mx) can be constructed in such a way that the prediction is biased towards Equation 4 for pixels closer to the reference block and biased towards the DC value for pixels further away from the reference block.

Low Complexity Mode of Operation

To reduce encoder and decoder complexity, embodiments can operate in low complexity mode, possibly with reduced coding efficiency. The low complexity mode can for example be applied for:

diagonal prediction according to direction (−0.5,−0.5) using Equation 2 and Equation 5.

vertical prediction according to direction (−0.5,0) using Equation 2 and Equation 5.

horizontal prediction according to direction (0,−0.5) using Equation 2 and Equation 5.

Dynamic Reference Update Using Template Matching

In state of the art template matching, described in e.g. "Infra prediction based on displacement and template matching, VCEG-AE11, January 2007", neighbouring decoded pixels to the current block/target is used as a template and a corresponding neighbouring reference/candidate region is moved among other decoded pixels to find the best match. The reference/candidate region at the corresponding position as the current block/target, e.g. beside the reference neighbouring region is then used for prediction of the current block/target The template matching can be viewed as a reference vector search in both the encoder and the decoder. Thus the encoder does not need to transmit the reference vector to the decoder.

The invention can be used to determine pixel values that are not assigned any value due to that the reference region is too close to the current block. The reference vector that corresponds to the best match by template matching can then, for example, be used in combination with Equation 4 or 5.

Inter Prediction for Reference Vector Pointing Outside Slice

When transmitting video over an error prone channel, a video frame is typically divided into several independently coded partitions, e.g. denoted slices. Sometimes the reference vector is pointing out a reference block that overlaps two slices in the previous decoded frame. If assuming that the partitions are fixed between two video frames, a dynamic reference update according to, for example, Equation 4, 5 or 7 can be made for the part of the reference block that lies in the slice which covers the same area as the current slice. This can thus produce an inter prediction for a first part of the block that has pixel values from another slice in the previously decoded frame than the slice covering the same area as the current slice. The other part of the block is extrapolated from the first part of the block.

Inter Prediction using both Interpolation and Extrapolation

In some cases there is occlusion happening between the current frame and a previous frame. In this case it can be of interest to use the inter prediction as in the state of the art for part of the block, and make an extrapolation from that prediction to fill in missing structures for the rest of the block. This can also give some additional prediction possibilities which can improve coding efficiency in general. For extrapolation can, for example, Equations 4, 5 or 7 be used. In this case it is also needed to describe which part of the block that shall use inter prediction. The partitioning can, for example, be described with division into four smaller blocks for each block and signalling which of the block that use extrapolation.

Another approach is to signal a second reference vector to describe how a block of the same size as the current block, e.g. denoted partitioning block, shall be positioned compared to the current block, and thus achieve partitioning of the current block into up to two areas. When the second reference vector is (0,0) the partitioning block overlaps the current block completely, and only inter prediction is performed. When the second reference vector is (4,4) the partitioning block is moved 4 pixels to the right and 4 pixels downwards and thus giving two partitions. In this case the overlapping area is still inter predicted but the non-overlapping area is extrapolated from the inter prediction. This second reference vector can also be used as in Equation 4,5 or 7 to determine the extrapolation.

A third approach is to constrain the extrapolation to only be based on decoded pixels of the current frame.

Figure 2A:
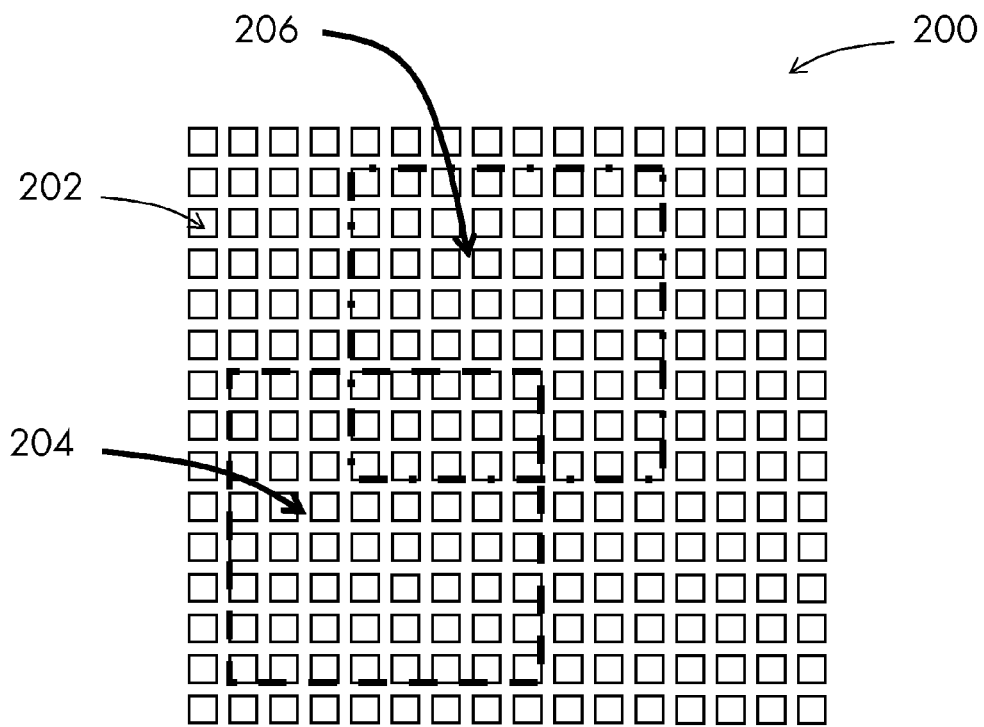
FIGS. 2a-b are illustrations of a reference region of pixels and a current region of pixels according to some exemplary embodiments.
Figure 2B:
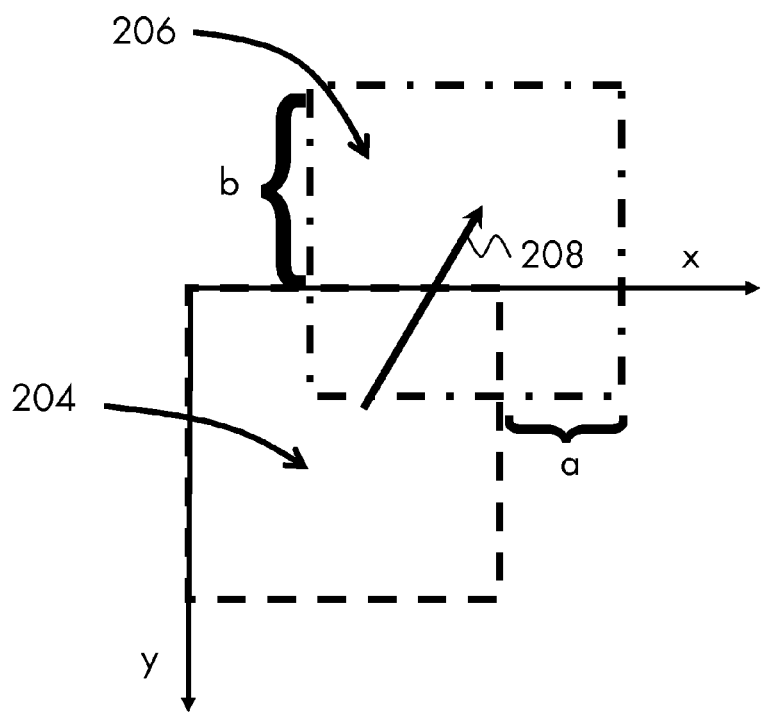

With reference to FIG. 2a, which is a schematic illustration, some principles enabling an image 200 to be encoded will now be described in accordance with an exemplary embodiment In the FIG. 2a, a part of the image 200 comprising pixels 202 is shown. In the image 200, a current region 204 and a reference region 206 are shown, the current region 204 being encompassed by a broken line and the reference region 206 being encompassed by a dash dotted line. The reference region 206 will be employed when encoding the current region 204. An image encoder searches for a reference region 206, which fulfils a condition of similarity with the current region 204. The reference region 206, being determined to best fulfil the condition of similarity, is spatially displaced in respect to the current region 204. Typically, the displacement is divided in a first displacement in one direction and a second displacement in a second direction With reference to FIG. 2b, which is another schematic illustration of the current region 204 and the reference region 206, both regions being defined in the embodiment described with reference to FIG. 2a, some further definitions will be introduced. In this exemplary embodiment the displacement of the reference region 206 in relation to the current region 204 is defined according to a coordinate system with Origo (0, 0) as the upper left pixel of the current region 204. In this embodiment the reference region 206 is spatially displaced "a" pixels along the x-axis, and "b" pixels along the y-axis. The displacement is defined by a reference vector 208, which is directed from one pixel in the current region 204 to a pixel with the corresponding position in the reference region 206. In this exemplary embodiment, the reference vector 208 comprises the offset values (a, −b). Even though, in this example, the x-axis is defined as the horizontal axis with increasing x-values to the right, and the y-axis is defined as the vertical axis with increasing y-values downwards, the invention is not limited thereto. Any other suitable coordinate system may be employed to enable the spatial displacement to be defined. Moreover, the reference vector 208 may be alternatively defined within the inventive concept for instance, the reference vector 208 may be directed from a pixel in the reference region 206 to the corresponding pixel in the current region 204.

Figure 3:
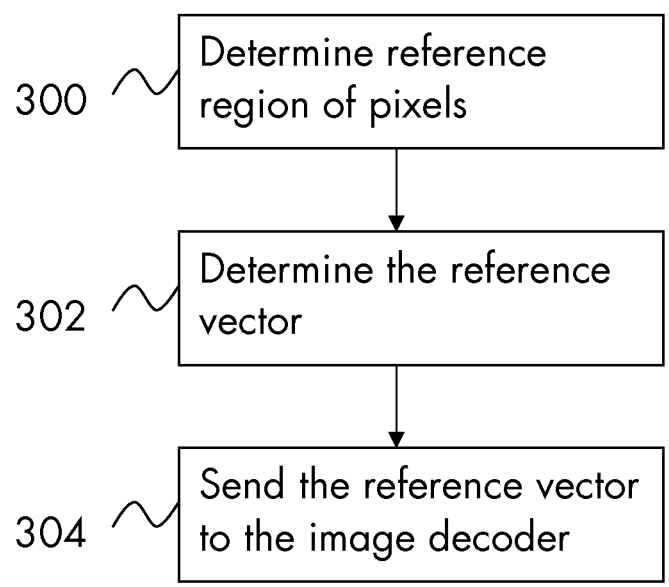
FIG. 3 is a flow chart illustrating a method in an image encoder according to a further exemplary embodiment.

The reference region is determined to be the region of an image which best fulfils a condition of similarity with a current region. The determination of the reference region may typically be performed by searching for a region in the image whose pixel values best fulfil a condition of similarity, by comparing the pixel values of the current region with the pixel values of the corresponding pixels in a plurality of candidate regions. Thus, a suitable similarity condition and suitable regions to compare the current region with should be selected. For instance, the similarity may condition be the sum of the absolute valued differences, or the sum of the squared differences between the pixel values in the current region and the pixel values of corresponding pixels in the regions to be evaluated. The regions to be evaluated may be the regions located within a specific number of pixels from the current region. In this embodiment, the current region and the regions to be evaluated are blocks of pixels. However, the invention is not limited to comparing blocks of, e.g. 8×8, 16×16, or 64×64 pixels; any other suitable sizes or forms of regions may employed when comparing. The search for a reference region and the selection of a similarity condition will not be further discussed in this description With reference to FIG. 3, which shows a schematic flow chart, a method in an image encoding arrangement will now be described in accordance with an exemplary embodiment In a first action 300, a reference region of an image is determined. The reference region is determined as the region which is most similar to a current region to be encoded. As described in conjunction with an embodiment above, the skilled person is able to select a suitable similarity condition to apply when comparing various regions with the current region, the various regions being at least partly encoded already. The determined reference region is typically determined as a similar region which is spatially displaced a number of pixels in a specific direction. For instance, the reference region may be determined as the region which is spatially displaced 3 pixels to the right and 5 pixels upwards in relation to the current region. However, also non-integer values may be determined as displacements in one or two directions. When using non-integer values to define a spatial displacement, the non-integer pixel values to be applied are determined by filtering a plurality of adjacent pixel values before comparing the pixel values with the pixel values of the reference region. For instance, a non-integer pixel value for a displacement along the x-axis can be formed as the mean value of the pixel value to the left and the pixel to the right of the non-integer pixel value. A typical implementation of non-integer offset values is when determining the reference vector as comprising half-pixels. For instance, a reference vector comprising the offset values (2.5; −7) defines that the reference region is spatially displaced 2.5 pixels to the right and 7 pixels up in relation to the current region. Each specific pixel value of the reference region is then determined to be formed as the sum of half the pixel value of the pixel being located 2 pixels to the right and 7 pixels up from the specific pixel, and half the pixel value of the pixel being located 3 pixels to the right and 7 pixels up from the specific pixel, e.g. linear interpolation. Other more general filters can be used such as described in Equation 5. As indicated above, half-pixels may also be applied for more than one direction, e.g. bilinear interpolation. The use of non-integer pixel offset values in the reference vector will enable a more accurate prediction of pixel values to be performed at the image decoder.

In a following action 302, a reference vector is determined based on the reference region. The reference vector comprises information about a spatial displacement of the reference region in relation to the current region. In this embodiment, the spatial displacement is defined as a first displacement in a first direction and a second displacement in a second direction, and the reference vector comprises the first and the second displacements. As described in conjunction with an embodiment above, the displacements are defined according to a coordinate system.

In a final action 304, the reference vector is provided to the image decoder to enable the image decoder to locate an initiation region when predicting pixel values. In this embodiment, the reference vector is transmitted to the image decoder, but is not limited thereto. Alternatively, the reference vector may instead be uploaded to a server to be obtained by the image decoder when needed, etc.

The described method enables reference regions which overlap the current region to be selected as reference regions, which enable the image decoder to identify and make use of variations of the pixel values for pixels located close the current region. Typically, a new reference region and a new reference vector will be determined and transmitted for each current region, enabling a flexible and dynamic prediction of pixel values at the image decoder.

It is to be noted that the image encoder and the image decoder also may exchange further information between each other, e.g. information regarding whether a reference vector will be employed or not the maximum length of the reference vector, the resolution of the reference vector, etc. However, for simplicity reasons, any means or functionality which is not necessary for the understanding of the proposed enabling of prediction of pixels has been omitted in the figures, and will not be discussed in any further detail in this description.

Figure 4A:
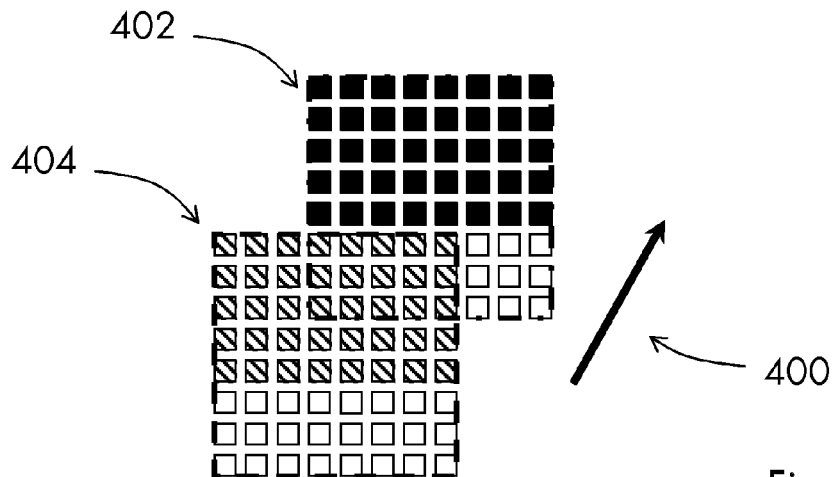
FIGS. 4a-c are illustrations of some procedural steps for prediction of pixels according to some other exemplary embodiments.
Figure 4B:
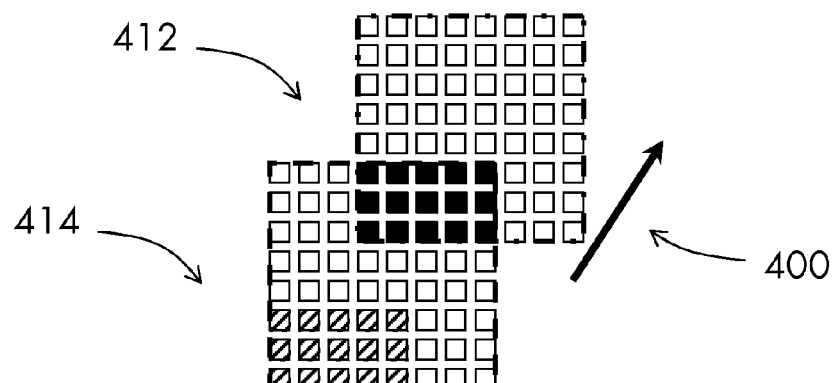
Figure 4C:
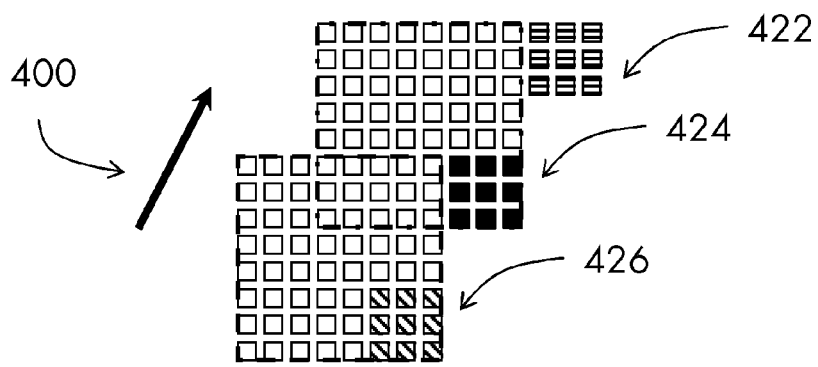

With reference to FIGS. 4a-4c, which are schematic illustrations, a process for prediction of pixel values in an image decoding arrangement will now be described in accordance with an exemplary embodiment A prediction region (illustrated with a broken line) and an initiation region (dash dotted line) are partially overlapping each other. The prediction region is the region to be predicted. The initiation region is determined to be the region which is spatially displaced according to the reference vector 400 in relation to the prediction region. In this embodiment, the reference vector comprises the offset values (3, −5), i.e. the initiation region is spatially displaced 3 pixels to the right and 5 pixels up in relation to the prediction region. The reference vector 400 at the image decoder defines the corresponding spatial displacement as the reference vector (shown in FIG. 2b) at the image encoder.

When the initiation region is determined, the pixel values of the prediction region are unknown, but the pixel values of some pixels 402 of the initiation region are known (filled black in FIG. 4a). As illustrated in FIG. 4a, the image decoder assigns the pixel values of the known pixels 402 to the pixels 404 of the corresponding positions in the prediction region (filled with diagonal lines in FIG. 4a).

When assigning pixel values of directly known pixels 402 to pixels 404 in the prediction region, the pixel values of some overlapping pixels 412 (black in FIG. 4b), which are located in both the initiation region and the prediction region, will be assigned pixel values. In a following step of the prediction process, the pixel values of the overlapping pixels 412 in the initiation region are assigned to the pixels 414 of the corresponding positions in the prediction region (filled with diagonal lines in FIG. 4b).

When having assigned both the pixel values of the known pixels 402 and the overlapping pixels 412 of the initiation region to the corresponding respective pixels 404 and 414 of the prediction region, some pixels 426 of the prediction region still lack pixel values. Those pixels 426 in the prediction region (filled with diagonal lines in FIG. 4c) would have been assigned the pixel values of the corresponding pixels 424 of the initiation region (black in FIG. 4c), but the pixel values of the pixels 424 are not known. The region covered by the pixels 424 of the initiation region, is the part of the initiation region which pixels have not directly known pixel values, and is not over-lapping the prediction region. In this embodiment this region (black in FIG. 4c) is referred to as the third region of the initiation region. However, because the initiation region is determined to be employed as basis for the prediction, it is assumed that the pixel values of the pixels 422 (filled with horizontal lines in FIG. 4c) which are displaced in relation to the third region according to the reference vector 400 and are located adjacent to the initiation region, would be the pixels whose pixel values best matches the pixel values of the corresponding pixels 424 (black) of the third region, and consequently also the pixels 426 (diagonal lines) of the prediction region. The pixel values of the pixels 422 (horizontal lines) are therefore assigned to the pixels 426 of the prediction region. Thus, pixels 422 are spatially displaced in relation to the pixels 426 of the prediction region according to the reference vector. However, the spatial displacement of the pixels is twice the length of the vector. Optionally, the pixel values of the pixels 422 may further be assigned to also to the corresponding pixels 424 of the third region.

Figure 5:
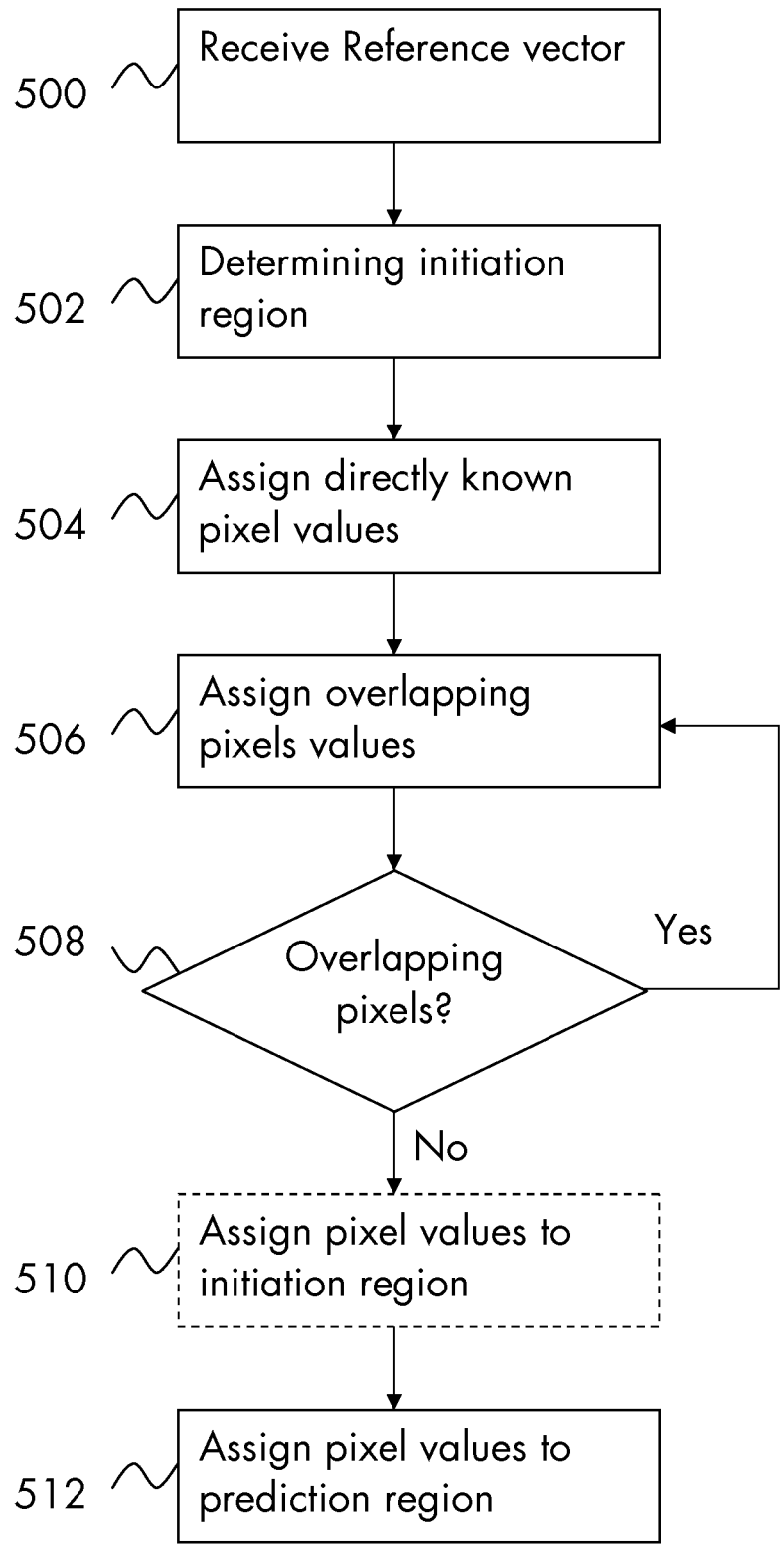
FIG. 5 is a flow chart illustrating a method in an image decoder according to a further exemplary embodiment.

With reference to FIG. 5, which shows a schematic flow chart, a method in an image decoding arrangement for prediction of pixel values of an image will now be described in accordance with an exemplary embodiment Ina first action 500, a reference vector is obtained from the image encoding arrangement. Typically, the reference vector is received from the image encoder, but may alternatively be obtained from a server where the image encoder has provided it etc. The reference vector comprises information regarding the spatial displacement of a reference region in relation to a current region of an image at the image encoding arrangement, as described above. The image, of which the pixel values are to be predicted in the image decoder, corresponds to the image of which the pixels are encoded at the image encoder. Furthermore, a prediction region of the image being predicted corresponds to the current region at the image encoder, and an initiation region of the image being predicted corresponds to the reference region at the image encoder. The initiation region is determined as the region of pixels being spatially displaced according to the reference vector in relation to the prediction region, in a following action 502.

In a subsequent action 504, the pixels of the prediction region, whose corresponding pixels in the initiation region which have known pixel values, are assigned the known pixel values of the initiation region. An example of this action 504 is illustrated in FIG. 4a.

In another action 506, the pixels of the prediction region whose corresponding pixels of the initiation region also are present in the prediction region, i.e. overlapping pixels, are assigned pixel values. The pixel values of the overlapping pixels of the initiation region where not known before the assignment of pixel values in action 504. However, through the action 504, the overlapping pixels of the initiation region were assigned pixel values. The pixel values of the overlapping pixels in the initiation region are then assigned to the corresponding pixels of the prediction region. An example of this action 506 is illustrated in FIG. 4*b*.

In another action 508, it is determined whether the overlapping region comprises further pixels which have unknown pixel values. Fit is determined that the overlapping region does not comprise any further pixels which have unknown pixel values, the process proceeds by performing action 512, which will be described below. If, on the other hand, it is determined that the overlapping region comprises further pixels which have unknown pixel values, the process proceeds by assigning the pixel values of the overlapping pixels in the initiation region which were assigned pixel values in action 506, to the corresponding pixels in the prediction region.

In other words, the process proceeds by returning to action 506. However, when repeated, the action 506 differs from the initial action 506, in that the pixels whose pixel values will be assigned to pixels in the prediction region were assigned their pixel values in the preceding action 506 instead of the action 504. As indicated above, the process proceeds by assigning pixel values to pixels in the prediction region, until no further pixels of the initiation region were assigned pixel values in the previous executed action 506.

Then in a following action 510, pixels in the initiation region whose pixel values are still unknown are assigned pixel values. The region defined by these pixels will be referred to as the third region of the initiation region. The pixels of the third region relates to the prediction region, as an extended region relates the initiation region. The extended region is spatially displaced from the third region according to the reference vector, received in action 500. Because it is determined that the initiation region is the region which will be employed to as basis for the prediction of pixel values, it is assumed that the extended region, which is positioned adjacent to the initiation region will be similar to the third region. Therefore, the values of the pixels of the extended region are assigned to the pixels of the third region.

In a final action 512, the pixel values of the pixels in the third region of the initiation region are assigned to their corresponding pixels in the prediction region. An example of the described actions 510 and 512 is illustrated in FIG. 4*c*.

However, the invention is not limited to the described exemplary embodiment. In an alternative embodiment, based on the one above, the action 510 of assigning pixel values to a third region may be omitted. The action 512 of assigning pixel values to pixels in the prediction region is then instead performed by assigning pixel values of pixels being spatially displaced according to twice the reference vector.

In another alternative embodiment, the image decoder determines the reference vector itself, based on pixel values which are received. For instance, the image decoder may determine the reference vector at the decoder through what is commonly referred to as template matching. The pixels in the reference region that are closest to the prediction region, e.g. an L-shaped template, are searched for in the reference area to find the vector (not equal to (0,0)) that gives the best match, e.g. least sum of absolute sum of difference between the candidate region and the reference area pointed out by the reference vector.

With reference to FIGS. 6*a-d*, which show schematic illustrations, an example of prediction of pixel values in an image decoding arrangement will now be described, in accordance with an exemplary embodiment.

Figure 6A:
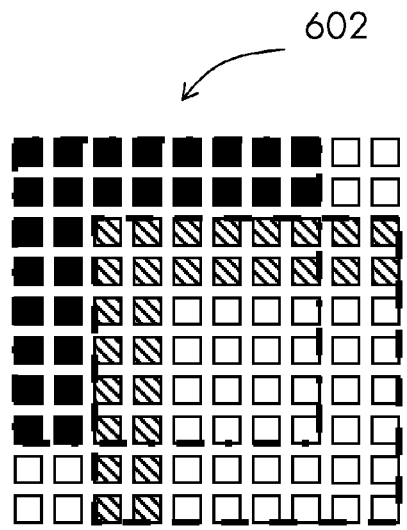
FIGS. 6a-d are illustrations of some steps in an example of predicting pixels according to another exemplary embodiment.

An image comprises a prediction region of pixels (encompassed by a broken line in the figure) and an initiation region of pixels (dash dotted line). There are pixels which are located in both the initiation region and in the prediction region, i.e. the regions overlap each other. In this embodiment, the initiation region is spatially displaced 2 pixels to the left and 2 pixels up in relation to the prediction region. As described in an embodiment above, the displacement is defined by a reference vector. The reference vector according to this embodiment comprises the offset values (−2, −2). The initiation region comprises pixels 602 (filled black in figure) whose pixel values are known to the image decoding arrangement The pixel values of these pixels 602 are assigned to the correspondingly located pixels 604 (filled with diagonal lines) in the prediction region, which is illustrated in FIG. 6*a*. The FIG. 6*a* illustrates also one example of the action 504 in FIG. 5.

Through the assignment of pixel values illustrated in FIG. 6*a*, the pixels 604*a* (black in FIG. 6*b*) of the initiation region were assigned pixel values. These pixel values are assigned to pixels 606 (filled with diagonal lines in FIG. 6*b*) in the prediction region. The pixels 606*a* (black in FIG. 6*c*) of the initiation region were assigned pixel values. Furthermore, through the assignment of pixel values illustrated in FIG. 6*b*, the pixels 606*a* (black in FIG. 6*c*) of the initiation region were assigned pixel values. These pixel values are assigned to pixels 608 (filled with diagonal lines in FIG. 6*c*) in the prediction region.

Figure 6B:
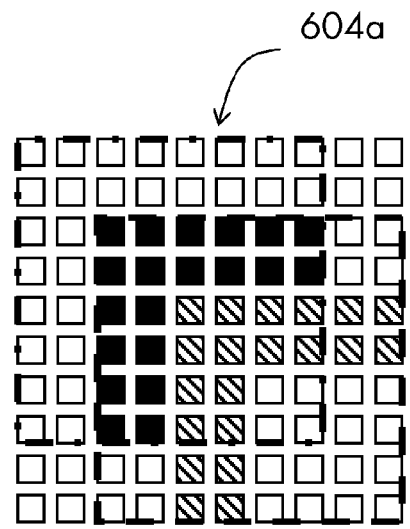
Figure 6C:
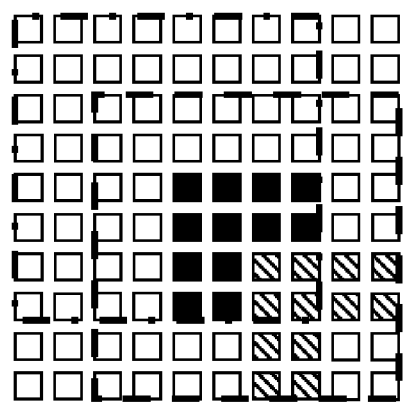
Figure 6D:
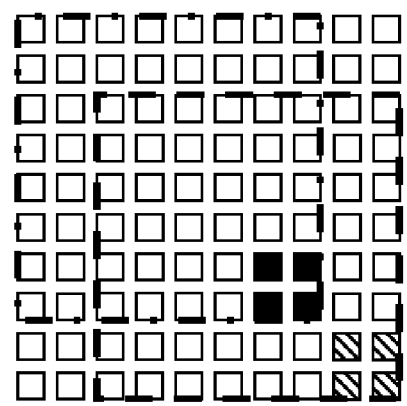

Likewise, through the assignment of pixel values illustrated in FIG. 6*c*, the pixels 608*a* (black in FIG. 6*d*) of the initiation region were assigned pixel values. These pixel values are assigned to pixels 610 (filled with diagonal lines in FIG. 6*d*) in the prediction region. The FIGS. 6*b-d* illustrates also examples of the action 506 in FIG. 5. In the described exemplary embodiment, the prediction region is iteratively assigned further pixel values, which were assigned in the prior step. However, even if the assignment in this exemplary embodiment was performed in four steps, it is not limited thereto. The process may be modified to a suitable number of iterative assignments, within the inventive concept.

Figure 7:
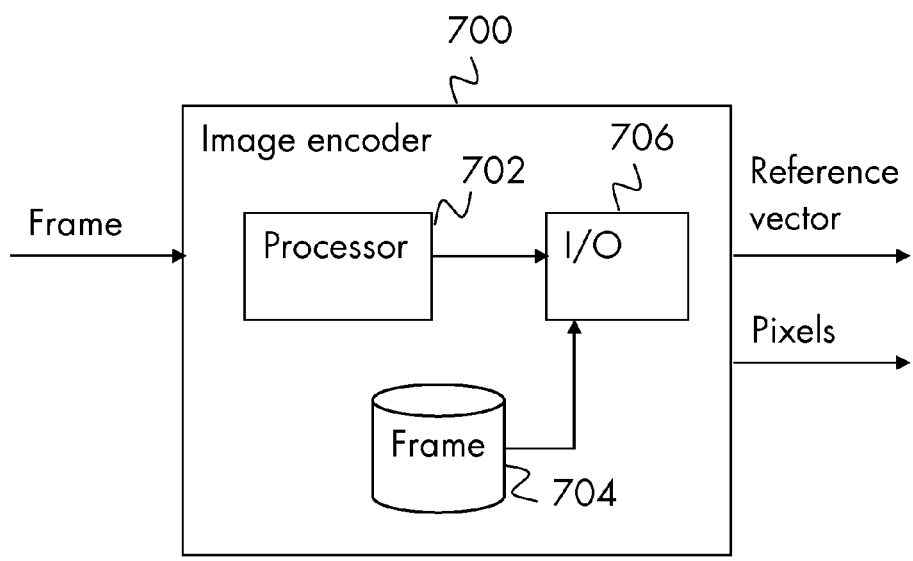
FIG. 7 is a block diagram illustrating an arrangement in an image encoder according to another exemplary embodiment.

With reference to FIG. 7, which is a schematic block diagram, an arrangement in an image encoder 700 will now be described, in accordance with an exemplary embodiment. The image encoder 700 is adapted to enable an image decoder to dynamically predict pixel values of pixels in an image, based on a reference vector and received pixel values which are sent from the image encoder 700.

The image encoder 700 comprises a processor 702, a memory 704 and a transmitter 706. The processor 702 is arranged to determine a reference region of an image wherein the reference region fulfils a similarity condition with the current region, and an overlapping region of the reference region overlaps a part of the current region. Furthermore, the processor 702 is adapted to determine a reference vector comprising a first pixel offset value and a second pixel offset value, where the first pixel offset value represents a first spatial displacement in a first direction between the current region and a reference region, and the second pixel offset value represents a second spatial displacement in a second direction between the current region and the reference region. The directions are typically parallel with the x-axis and the y-axis, respectively, as described in an embodiment above. However, the invention is not limited to a specific coordinate system; any other suitable directions may be applied within the inventive concept.

The memory 704 is arranged to store pixel values of one or more images, and the transmitter 706 is arranged to send the reference vector and pixel values of the current image to the image decoder, the reference vector and the pixel values to be applied as basis when predicting pixel values.

Figure 8:
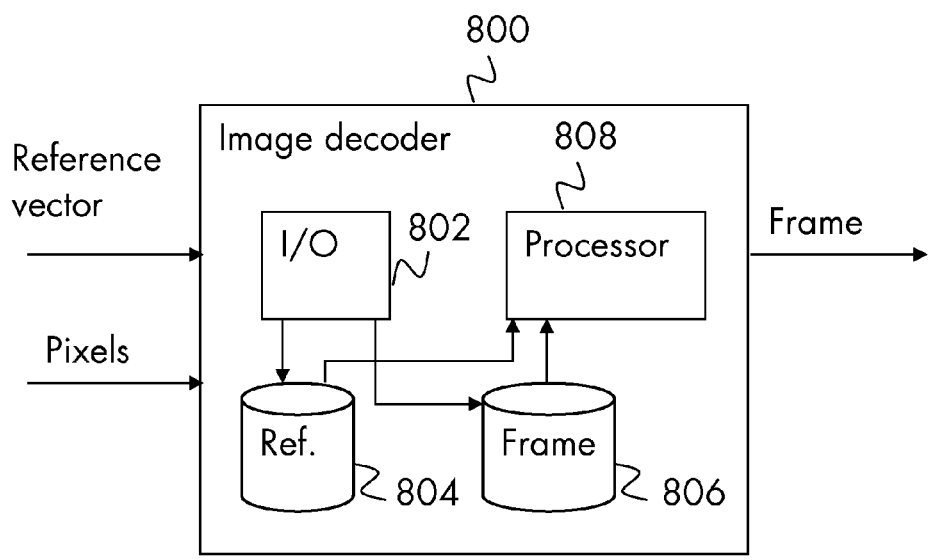
FIG. 8 is a block diagram illustrating an arrangement in an image decoder according to another exemplary embodiment.

With reference to FIG. 8, which is a schematic block diagram, an arrangement in an image decoder 800 will now be described, in accordance with an exemplary embodiment The image decoder 800 is adapted to dynamically predict pixel values of pixels in an image, based on a received reference vector and received pixel values which already are decoded/predicted. The image decoder 800 comprises a receiver 802, a first memory 804, a second memory 806, and a processor 808. The receiver 802 is adapted to receive a reference vector and pixel values from an image encoder, the reference vector comprising a first pixel offset value and a second pixel offset value. The first pixel offset value represents a first spatial displacement in a first direction between a current region and a reference region at the image encoder, and the second pixel offset value represents a second spatial displacement in a second direction between the current region and the reference region at the image encoder.

The first memory 804 is arranged to store the received reference vector, and the second memory 806 is arranged to store pixel values of one or more images. For instance, the second memory 806 may store the values of pixels in an image which is being predicted, or images of a video sequence. It is to be noted that the first memory 804 and the second memory 806 may typically be implemented in one and the same unit.

The processor 808 is adapted to determine an initiation region based on the prediction region and the reference vector, an overlapping region of the initiation region overlapping a part of the prediction region. Furthermore, the processor 808 is also adapted to assign received pixel values for pixels in the initiation region to the corresponding pixels in the prediction region, and further adapted to assign pixel values of pixels in the overlapping region of the initiation region to the corresponding pixels in the prediction region.

In an alternative embodiment, based on the one described above, the processor 808 is further adapted to assign to the pixels in a third region of the initiation region, the pixel values of the corresponding pixels, being spatially displaced to the third region according to the reference vector, and assign the pixel values of the third region of the initiation region to the corresponding pixels in the prediction region. This assignment is described in an embodiment above. However, the processor 808, may be implemented different, e.g. it could assign pixel values to the prediction region based on the reference vector and omit assigning pixel values to the third region, as described in an embodiment above.

Moreover, the processor 808 may be adapted to determine the initiation region as being spatially displaced a non-integer value of pixels in one or more directions, e.g. half-pixel image values may be employed. The processor may further be adapted to determine the reference vector itself, base on received pixel values of one or more images.

It is to be denoted that the invention is not limited to the above described exemplary embodiments. For instance, the image decoding arrangement may comprise functionality enabling determination of the reference vector based on image information which the image decoder already has access to. Such a determination may be implemented by e.g. template matching.

Furthermore, it is to be understood that the image encoder and image decoder described above in this description also comprises additional conventional means providing functionality, such as e.g. various control units and memories, necessary for enabling common functions and features to operate properly. For instance, the pixel values are entropy encoded when transmitted, and therefore the image encoder typically comprises an entropy encoder, and the image decoder an entropy decoder. However, for simplicity reasons, any means or functionality which is not necessary for the understanding of the proposed enabling of the terminating services has been omitted in the figures, and will not be discussed in any further detail in this description.

It should be noted that the FIGS. 7 and 8 merely illustrates various functional unit in the image encoder 700 and the image decoder 800, respectively, in a logical sense, although the skilled person is free to implement these functions in practice using any suitable software and hardware means. Thus, the invention is generally not limited to the shown structure of the image encoder 700, and the image decoder 800, respectively, while their functional unit may be configured to operate according to the methods and procedures described above for FIGS. 3-6, where appropriate. For instance, any functionality in a specific functional unit may be placed in another suitable functional unit, where appropriate, e.g. may the memories 804 and 806 be implemented in one and the same unit.

It is to be noted that the marked pixels are marked in order to point out specific regions when performing the prediction process, and that pixels marked with a specific marking does not necessarily have the same values. For instance, the black marked pixels in the overlapping region may have a plurality of different pixel values.

Moreover, the methods and arrangement described in the description are typically to be employed to predict pixel values that together with transmitted residual form the representation of a frame in a compressed video stream.

Furthermore, it is to be understood that a skilled person realises how to combine characterising features of the above described embodiments, when designing an image encoding or decoding arrangement, and when devising methods in such arrangement. For instance, he/she may select a suitable similarity condition to be applied, a suitable form of the regions to be compared, whether the reference vector will be determined in the image encoding arrangement or in the image decoding arrangement, etc. Moreover, the skilled person is capable to modify the method or arrangement of any embodiment, to select a reference region and initiation region from a different image frame than the current region and the prediction region for instance, inter related image frames may be employed.

With the methods described in conjunction with the exemplary embodiments, characteristic variations close to the prediction region are possible to utilise when predicting images. The invention is generally defined by the following independent claims.

Embodiments are defined by the dependent claims.

The invention claimed is:

1. A method in an image decoder for assigning pixel values to pixels in a prediction region of an image, the method comprising:
   obtaining a reference vector provided by the image encoder,
   determining an initiation region of pixels corresponding to a reference region of pixels at the image encoder, the initiation region being spatially displaced in relation to the prediction region according to the reference vector and partly overlapping with the prediction region, wherein pixel values of pixels in overlapping parts of the initiation and prediction regions are unknown, assigning pixel values to the pixels in the overlapping parts of the initiation and prediction regions by assigning known pixel values of pixels in a non-overlapping part of the initiation region to pixels in a corresponding part of the prediction region, wherein the pixels in the corresponding part of the prediction region at least include the pixels in the overlapping parts of the initiation and prediction regions, and assigning the pixel values assigned to the pixels in the overlapping part of the initiation region to the corresponding pixels in the prediction region.

2. The method according to claim 1, further comprising iteratively assigning pixel values of pixels in the overlapping part of the prediction region to other pixels in the overlapping part of the prediction region, whose pixel values are not known.

3. The method according to claim 1, wherein the reference vector comprises a first pixel offset value and a second pixel offset value, the first pixel offset value representing a first spatial offset between a reference region of pixels and a current region of pixels at the image encoder, and the second pixel offset value representing a second spatial offset between the reference region of pixels and the current region of pixels at the image encoder.

4. The method according to claim 3, wherein the first pixel offset value represents a first spatial displacement in a first direction between the current region and the reference region at the image encoder, and the second pixel offset represents a second spatial displacement in a second direction between the current region and the reference region at the image encoder, the first direction is parallel with a horizontal axis and the second direction is parallel with a vertical axis.

5. The method according to claim 3, wherein at least one of the first pixel offset value and the second pixel offset value comprises a non-integer.

6. The method according to claim 1, further comprising assigning pixels in a third region of the initiation region the pixel values of the corresponding pixels being spatially displaced to the third region according to the reference vector, and assigning pixel values of the third region of the initiation region to the corresponding pixels in the prediction region.

7. The method according to claim 1, further comprising assigning to pixels in the prediction region, the pixel values of the corresponding pixels being spatially displaced according to a multiple of the reference vector.

8. An arrangement in an image decoder adapted to assign pixel values to pixels in a prediction region of an image, the arrangement comprising:

a receiver configured to obtain a reference vector provided by the image encoder and receive pixel values from the image encoder, a first memory configured to store the reference vector, a second memory configured to store pixel values of one or more images, and a processor configured to determine an initiation region based on the prediction region and the reference vector, the initiation region being partly overlapping with the prediction region, wherein pixel values of pixels in overlapping parts of the initiation and prediction regions are unknown, the processor being further configured to assign pixel values to the pixels in the overlapping parts of the initiation and prediction regions by assigning known pixel values of pixels in a non-overlapping part of the initiation region to pixels in a corresponding part of the prediction region, wherein the pixels in the corresponding part of the prediction region at least include the pixels in the overlapping parts of the initiation and prediction regions, and further configured to assign the pixel values assigned to the pixels in the overlapping part of the initiation region to the corresponding pixels in the prediction region.

9. The arrangement according to claim 8, wherein the processor is further configured to iteratively assign pixel values of pixels in the overlapping part of the prediction region to other pixels in the overlapping part of the prediction region whose pixel values are not known.

10. The arrangement according to claim 8, wherein the processor is configured to employ a first pixel offset value and a second pixel offset value when determining the initiation region, the first pixel offset value representing a first spatial displacement in a first direction between a current region and a reference region at the image encoder, and the second pixel offset value representing a second spatial displacement in a second direction between the current region and the reference region at the image encoder.

11. The arrangement according to claim 10, when at least one of the first pixel offset value and the second pixel offset value comprises a non-integer value, the processor is further configured to determine the pixel values of the initiation region based on the pixel values of two or more pixels being located adjacent to the respective pixels in the reference region.

12. The arrangement according to claim 8, wherein the processor is further configured to assign pixels in a third region of the initiation region the pixel values of the corresponding pixels, the corresponding pixels being spatially displaced to the third region according to the reference vector, and assign the pixel values of the third region of the initiation region to the corresponding pixels in the prediction region.

13. The arrangement according to claim 8, wherein the processor is further configured to assign to pixels in the prediction region, the pixel values of the corresponding pixels being spatially displaced according to a multiple of the reference vector.

14. The arrangement according to claim 8, wherein the processor is further configured to determine the reference vector based on pixel values of one or more images.

* * * * *

UNITED STATES PATENT AND TRADEMARK OFFICE
CERTIFICATE OF CORRECTION

PATENT NO.        : 8,897,585 B2
APPLICATION NO.   : 13/505735
DATED             : November 25, 2014
INVENTOR(S)       : Samuelsson et al.

Page 1 of 2

It is certified that error appears in the above-identified patent and that said Letters Patent is hereby corrected as shown below:

On the title page, item (74), under "Attorney, Agent, or Firm", in Column 1, Line 1,
delete "Coats & Bennent," and insert -- Coats & Bennett, --, therefor.

In the specification

In Column 1, Lines 16-17, delete "infra prediction." and insert -- intra prediction. --, therefor.

In Column 1, Lines 17-18, delete "infra prediction" and insert -- intra prediction --, therefor.

In Column 1, Line 32, delete "Infra" and insert -- Intra --, therefor.

In Column 1, Line 33, delete "do c" and insert -- doc --, therefor.

In Column 1, Line 37, delete "filter." and insert -- filter --, therefor.

In Column 1, Line 50, delete "infra" and insert -- intra --, therefor.

In Column 1, Line 66, delete "Co sinus" and insert -- Cosine --, therefor.

In Column 2, Line 23, delete "arrangement" and insert -- arrangements --, therefor.

In Column 3, Line 54, delete "transmit" and insert -- transmits --, therefor.

In Column 4, Line 12, delete "Ina" and insert -- In a --, therefor.

In Column 4, Line 21, delete "coupled" and insert -- completed --, therefor.

In Column 4, Line 42, delete "infra" and insert -- intra --, therefor.

Signed and Sealed this
Third Day of November, 2015

Michelle K. Lee
*Director of the United States Patent and Trademark Office*

CERTIFICATE OF CORRECTION (continued)
U.S. Pat. No. 8,897,585 B2

In the specification

In Column 4, Line 44, delete "block The" and insert -- block. The --, therefor.

In Column 5, Line 66, delete "[0.5 0.5]" and insert -- [0.5, 0.5] --, therefor.

In Column 6, Line 22, delete "Co sinus)." and insert -- Cosine). --, therefor.

In Column 6, Line 23, delete "pixels." and insert -- pixels, --, therefor.

In Column 6, Line 44, delete ""Infra" and insert -- "Intra --, therefor.

In Column 7, Line 55, delete "direction" and insert -- direction. --, therefor.

In Column 8, Line 10, delete "concept for instance," and insert -- concept. For instance, --, therefor.

In Column 8, Line 35, delete "description" and insert -- description. --, therefor.

In Column 8, Line 38, delete "embodiment" and insert -- embodiment. --, therefor.

In Column 9, Line 6, delete "bilinear" and insert -- bi-linear --, therefor.

In Column 9, Line 39, delete "or not" and insert -- or not, --, therefor.

In Column 10, Line 43, delete "embodiment" and insert -- embodiment. --, therefor.

In Column 10, Line 44, delete "Ina" and insert -- In a --, therefor.

In Column 10, Lines 47-48, delete "provided it" and insert -- provided it, --, therefor.

In Column 11, Line 12, delete "Fit" and insert -- If it --, therefor.

In Column 14, Line 12, delete "unit" and insert -- units --, therefor.

In Column 14, Line 31, delete "arrangement" and insert -- arrangements --, therefor.

In Column 14, Line 39, delete "arrangement." and insert -- arrangements. --, therefor.